United States Patent [19]
Ogawa

[11] Patent Number: 6,085,817
[45] Date of Patent: Jul. 11, 2000

[54] PNEUMATIC TIRES WITH CARCASS ANCHORED BY BEAD WIRE REINFORCING LAYER

[75] Inventor: Yuichiro Ogawa, Fuchu, Japan

[73] Assignee: Bridgestone Corporation, Tokyo, Japan

[21] Appl. No.: 09/134,997

[22] Filed: Aug. 17, 1998

[30] Foreign Application Priority Data

Aug. 15, 1997 [JP] Japan ..................................... 9-235348
Jul. 3, 1998 [JP] Japan ................................... 10-188440

[51] Int. Cl.$^7$ ........................... B60C 15/00; B60C 15/06; B60C 9/02
[52] U.S. Cl. ........................... 152/543; 152/539; 152/550
[58] Field of Search .................... 152/539, 543, 152/550, 548, 560, 542, 552

[56] References Cited

U.S. PATENT DOCUMENTS

| | | | |
|---|---|---|---|
| 3,072,171 | 1/1963 | Drakeford et al. | 152/542 X |
| 3,815,652 | 6/1974 | Pouilloux | 152/543 X |
| 5,660,656 | 8/1997 | Herbelleauu et al. | 152/550 X |

FOREIGN PATENT DOCUMENTS

| | | |
|---|---|---|
| 47-40601 | 12/1972 | Japan . |
| 2-501378 | 5/1990 | Japan . |
| 6-171306 | 6/1994 | Japan . |

*Primary Examiner*—Adrienne C. Johnstone
*Attorney, Agent, or Firm*—Sughrue, Mion, Zinn, Macpeak & Seas, PLLC

[57] ABSTRACT

A pneumatic tire comprises a carcass made from at least one cord array comprised of many arch portions of a cord extending between a pair of bead portions in a meridional direction and arranged over a full circumference of the tire at an equal interval P in a circumferential direction of the tire and many circumferential portions of the cord alternately arranged in the bead portions, each connecting ends of adjacent arch portions to each other in the bead portion and extending substantially in the circumferential direction. In this case, the cord array is arranged at n layers (n is an integer of 2 or more) while offsetting these layers by a distance L obtained by dividing the interval P by n in the circumferential direction. Further, the bead wire reinforcing layer is arranged outward from the overlap region of the circumferential portions in the radial direction so as to sandwich the cord array from both sides thereof.

6 Claims, 9 Drawing Sheets

FIG_6

FIG_14
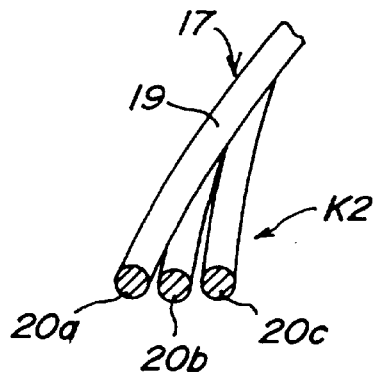
FIG_15
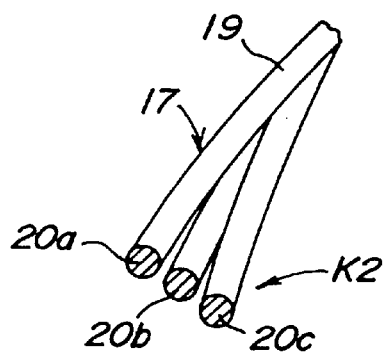
FIG_16
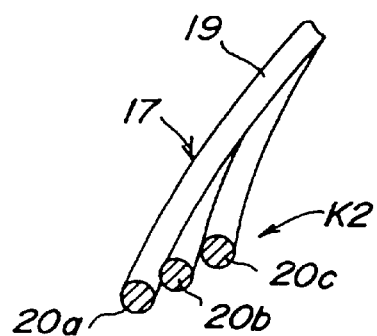

PNEUMATIC TIRES WITH CARCASS ANCHORED BY BEAD WIRE REINFORCING LAYER

BACKGROUND OF THE INVENTION

1. Field of the Invention

This invention relates to a pneumatic tire comprising a carcass formed by putting cords to an outside of a support and a method of building the same.

2. Description of Related Art

As the pneumatic tire comprising a carcass formed by putting cords to an outside of a support, there has hitherto been known a tire described, for example, in JP-A-6-171306. In such a tire, the carcass is comprised of a cord toroidally extending between a pair of bead portions in a meridional direction, which consists of many arch portions arranged over a full circumference of the tire so as to separate away from each other at a constant pitch C in a center of the tread in the circumferential direction, and many circumferential portions alternately connecting radially inward ends of the adjacent arch portions located in both bead portions to each other and extending substantially in the circumferential direction. In order to anchor the cord of the carcass in the bead portion, inner and outer bead layers are formed by spirally winding a bead cord plural times at the outside and inside of the circumferential portion in the axial direction of the tire in the vicinity of the radially inward end of the arch portion, respectively. A high-hardness rubber layer is arranged between the inner bead layer and the carcass and between the outer bead layer and the carcass to join the inner and outer bead layers to each other, whereby it is prevented to get out the circumferential portion of the carcass outward in the radial direction of the tire.

In the conventional pneumatic tire, however, there is a problem that since each of the circumferential portions is made from a single fine cord, even if the high-hardness rubber layer is arranged between the carcass and the inner bead layer and between the carcass and the outer bead layer as mentioned above, the getting out of the circumferential portion can not sufficiently be prevented. Also, the distance in the circumferential direction between the arch portions constituting the carcass or a constant pitch C is narrow, so that it is difficult to conduct the putting work of the cord.

SUMMARY OF THE INVENTION

It is, therefore, an object of the invention to provide a pneumatic tire being simple in the building and capable of strongly anchoring cords constituting the carcass in the bead portion as well as a method of building the same.

According to a first aspect of the invention, there is the provision of a pneumatic tire comprising a carcass made from at least one cord array comprised of many arch portions of a cord extending between a pair of bead portions in a meridional direction and arranged over a full circumference of the tire at an equal interval P in a circumferential direction of the tire and many circumferential portions of the cord alternately arranged in the bead portions, each connecting ends of adjacent arch portions to each other in the bead portion and extending substantially in the circumferential direction, provided that the cord array is arranged at n layers (n is an integer of 2 or more) while offsetting these layers by a distance L obtained by dividing the interval P by n in the circumferential direction and the circumferential portions of these layers made from the cord array are substantially contacted with each other to from an overlap region, and a bead wire reinforcing layer formed by winding a bead wire plural times in the circumferential direction and arranged so as to sandwich the cord array in the vicinity of a boundary between the arch portion and the circumferential portion from both sides thereof to thereby strongly anchor the overlap region of the carcass by the bead wire reinforcing layer.

According to a second aspect of the invention, there is the provision of a method of building a pneumatic tire, which comprises the steps of:

arranging an inner bead wire reinforcing layer in a position corresponding to a bead portion by winding a bead wire on an outside of a support attached with an inner rubber layer plural times in a circumferential direction of the support;

shaping a cord array comprised of many arch portions and many circumferential portions by repeating over a full circumference of the support a working operation that a cord is extended from one of the bead portions to the other bead portion along the outer surface of the support in a meridional direction to form a toroidal arch portion and extended substantially in the circumferential direction at the other bead portion by a distance P to form a circumferential portion and again extended from the other bead portion to the one bead portion in the meridional direction to form another arch portion and again extended substantially in the circumferential direction in the one bead portion by the distance P to form another circumferential portion;

repeating the shaping of the cord array n times (n is an integer of 2 or more) while offsetting by a distance L obtained by dividing the distance P by n in the circumferential direction and substantially contacting the circumferential portions in each of the bead portions with each other to form a carcass;

arranging an outer bead wire reinforcing layer by winding a bead wire plural times in the circumferential direction at the outside of the support to sandwich the cord array in the vicinity of a boundary between the arch portion and the circumferential portion from both sides thereof together with the inner bead wire reinforcing layer in each bead portion to thereby strongly anchor an overlap region formed by the contact of the circumferential portions by the inner and outer bead wire reinforcing layers.

In the invention, the carcass is formed by arranging the cord array comprised of many arch portions separated from each other at an equal distance P in the circumferential direction and many circumferential portions alternately arranged in the bead portions and connecting the ends of the adjacent arch portions to each other at n layers (n is an integer of 2 or more) by the distance L, so that the distance P between the arch portions constituting the cord array is wider by n times than the constant pitch C (equal to the above distance L) in the conventional technique and hence the putting work of the cord for the formation of the carcass is simple and easy. And also, the carcass has an overlap region formed by substantially contacting the circumferential portions with each other, so that these circumferential portions are restrained with each other by the contact in the overlap region and hence the size of the circumferential portion as a whole is apparently larger than that of the circumferential portion in the single cord. Furthermore, the bead wire reinforcing layers are arranged so as to sandwich the cord array from both sides thereof in the vicinity of a boundary between the arch portion and the circumferential portion located outward from the overlap region in the radial direction, so that the overlap region is strongly anchored by these bead wire reinforcing layers to surely prevent the getting out from the bead portion.

BRIEF DESCRIPTION OF THE DRAWINGS

The invention will be described with reference to the accompanying drawings, wherein:

FIG. 14 is a meridional section view illustrating circumferential portions at an overlap region in an eight embodiment of the invention;

FIG. 15 is a meridional section view illustrating circumferential portions at an overlap region in a ninth embodiment of the invention; and FIG. 16 is a meridional section view illustrating circumferential portions at an overlap region in a tenth embodiment of the invention.

DESCRIPTION OF PREFERRED EMBODIMENTS

Figure 1:
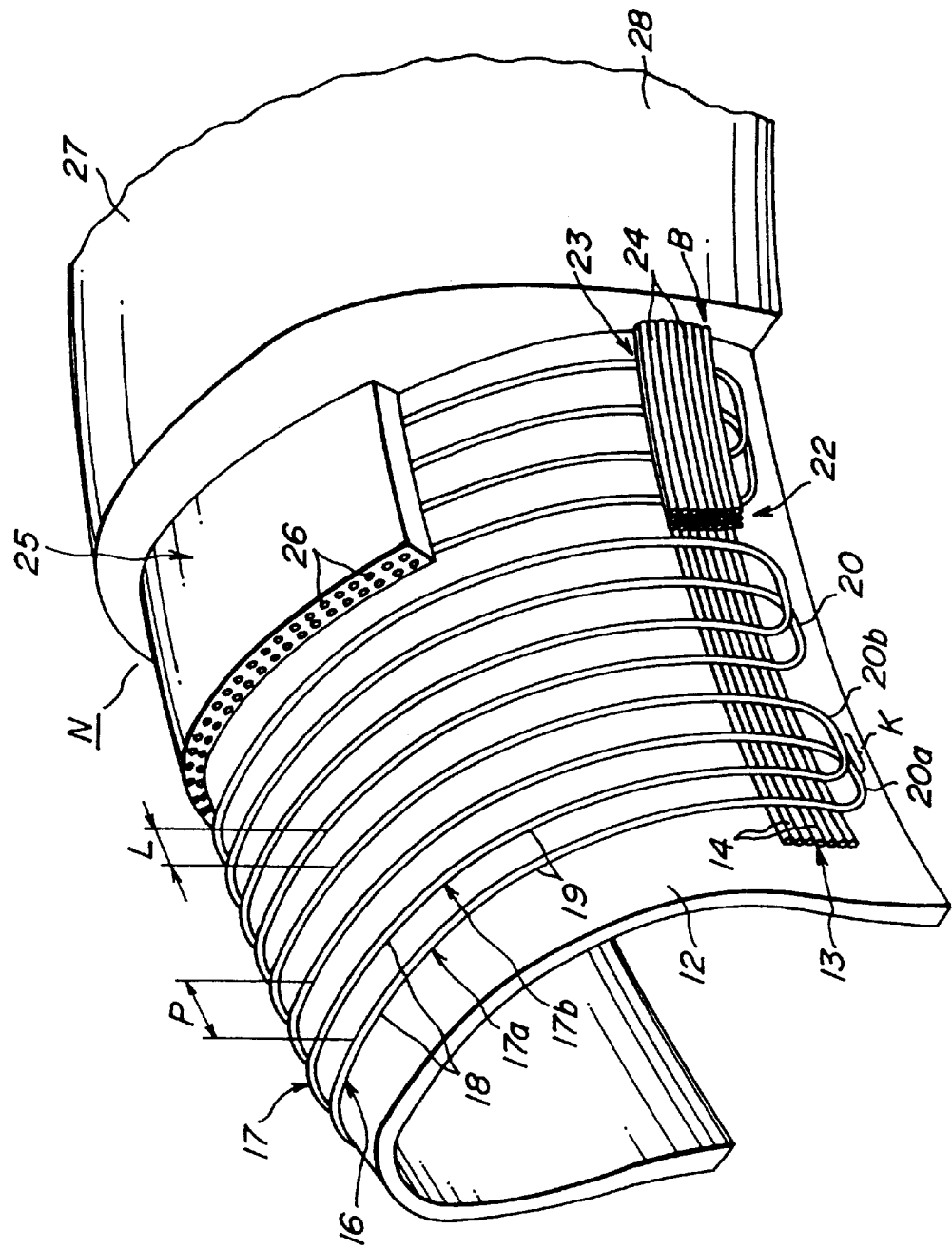
FIG. 1 is a partially cutaway perspective view of a green tire in a first embodiment of the pneumatic tire according to the invention.
Figure 2:
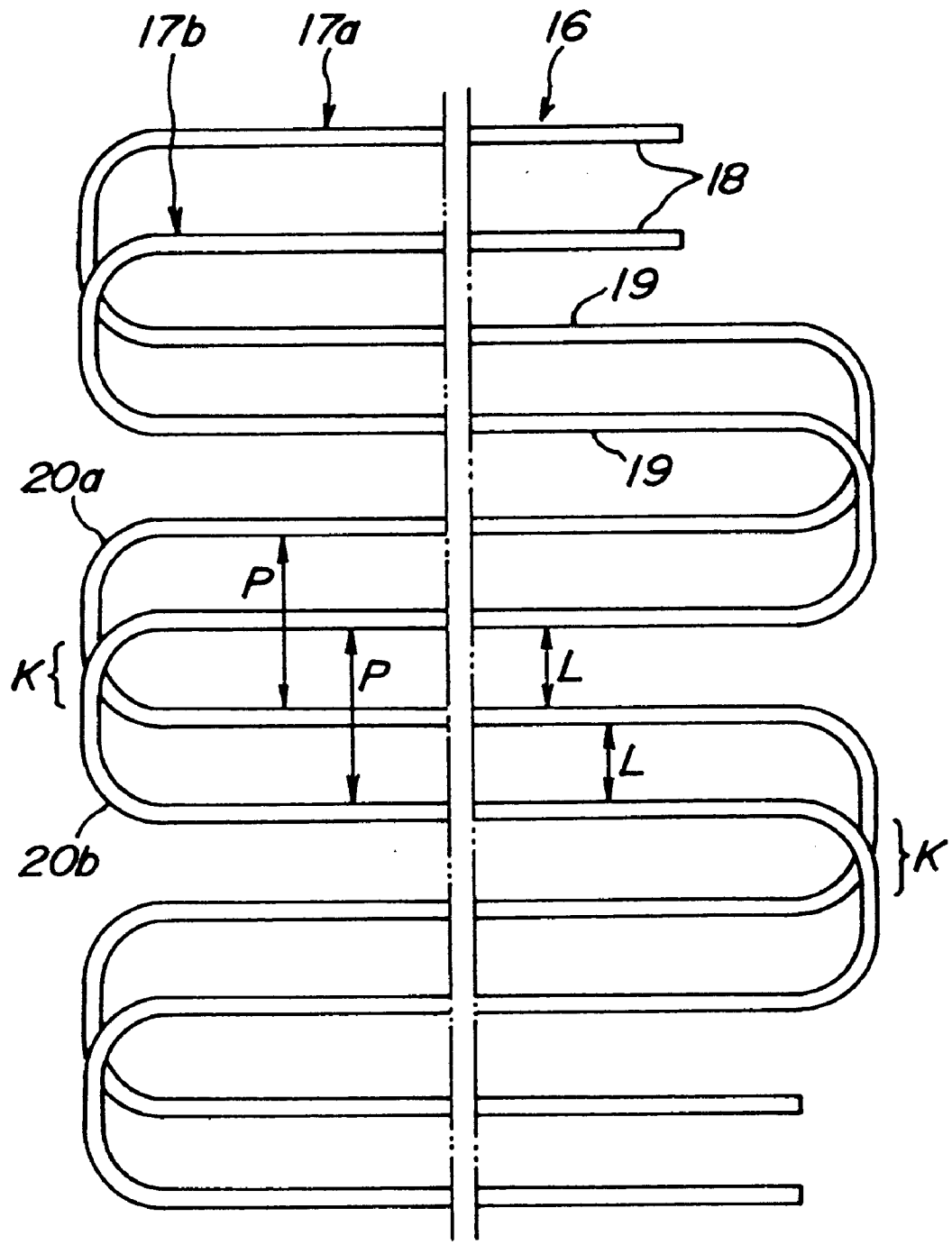
FIG. 2 is a developed plane view illustrating a cord array in the first embodiment.
Figure 3:
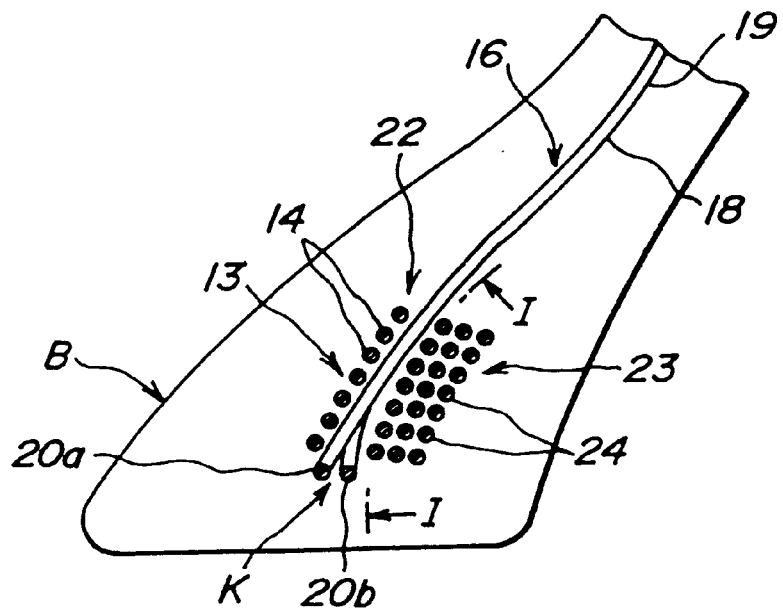
FIG. 3 is a meridionally section view of a bead portion in the first embodiment.
Figure 4:
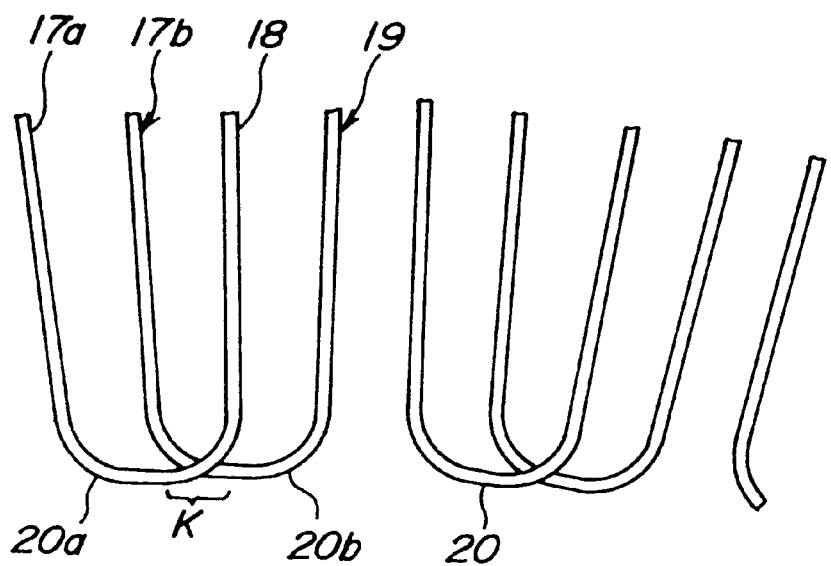
FIG. 4 is a view showing an arrangement of the cord array by arrows I—I in FIG. 3.
Figure 5:
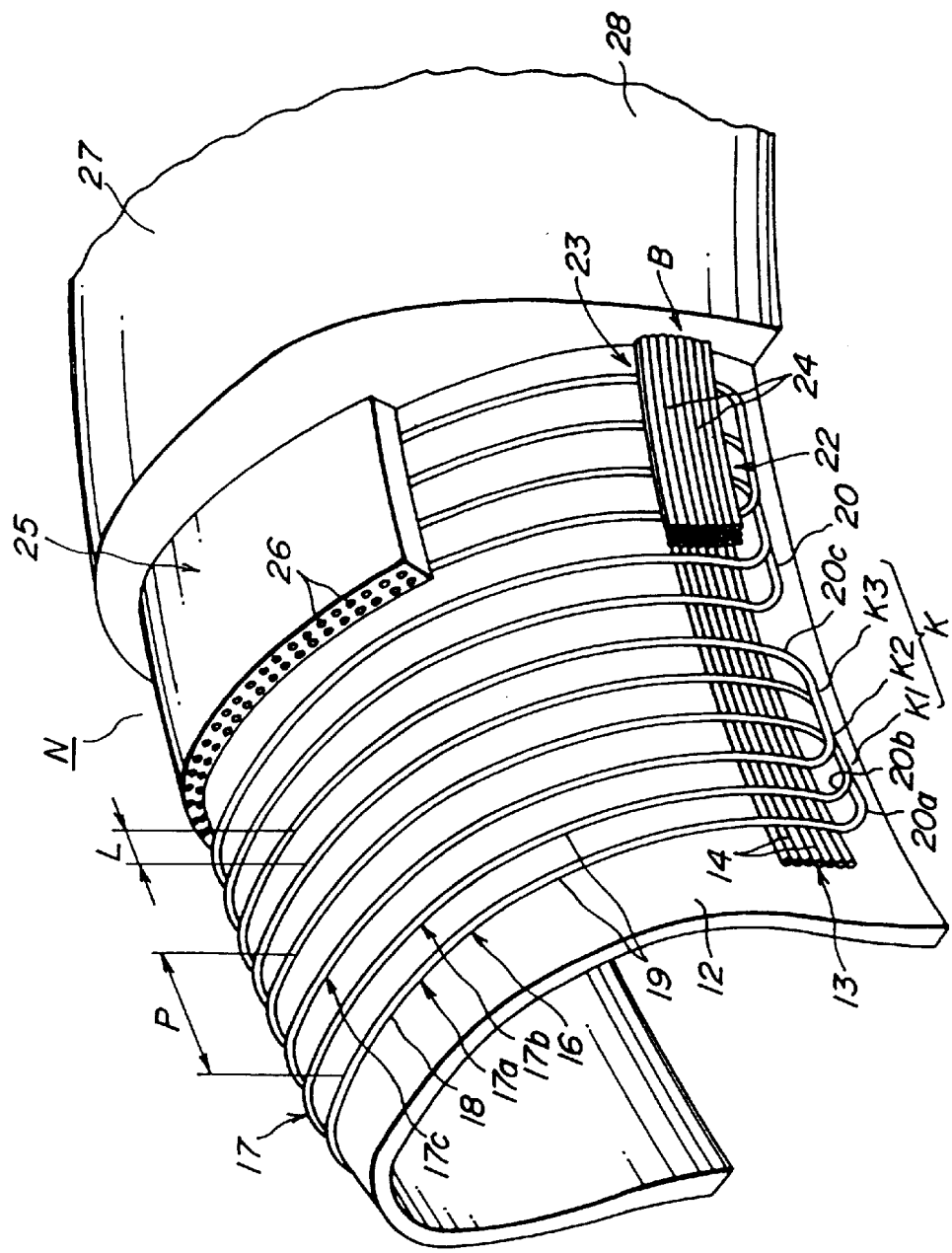
FIG. 5 is a partially cutaway perspective view of a green tire in a second embodiment of the pneumatic tire according to the invention.
Figure 6:
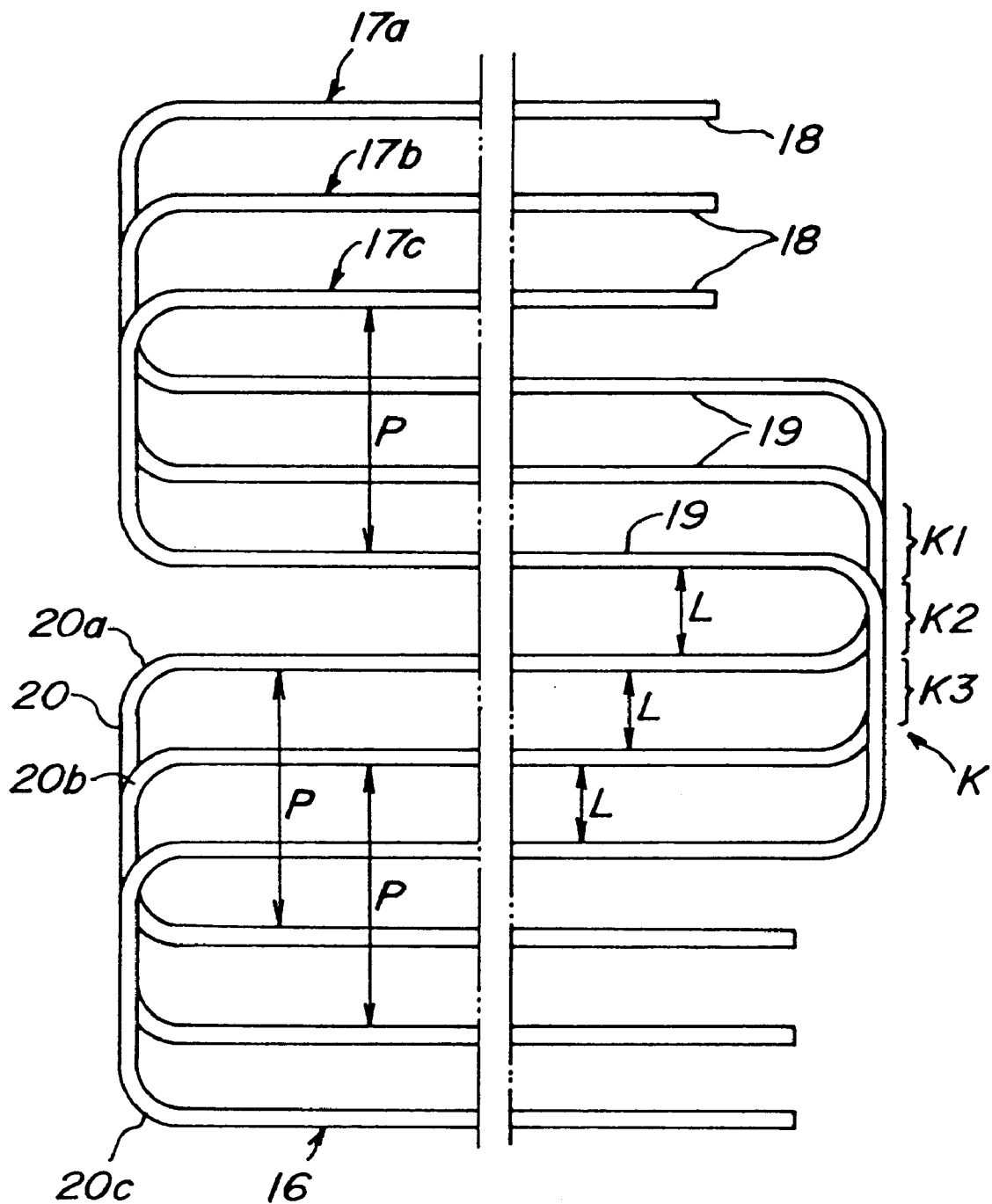
FIG. 6 is a developed plane view illustrating a cord array in the second embodiment.

In FIG. 1, symbol N is a green tire built by using a support (inner mold, not shown). The green tire N has an inner rubber layer 12 such as an innerliner or the like put onto an outer surface of the support. The inner rubber layer 12 is formed by winding a band-shaped rubber around the support plural times while rotating the support around a central axis thereof. An inner bead wire reinforcing layer 13 arranged at the outside of the inner rubber layer 12 in a position corresponding to each bead portion B and constructed by spirally winding a bead wire 14 of single steel wire covered with rubber plural times on the outside of the inner rubber layer 12 in the circumferential direction. In this case, the inner bead wire reinforcing layer 13 is used by arranging the bead wire 14 at 1–3 rows in the axial direction and at 5–10 columns in the radial direction.

In FIGS. 1–4, numeral 16 is a carcass having a toroidal shape in section and arranged to surround outsides of the inner rubber layer 12 and the inner bead wire reinforcing layer 13. The carcass 15 is comprised of cord arrays 17 of n layers (n is an integer of 2 or more and is 2 in the illustrated embodiment). The cord array 17 is comprised of many arch portions 19 of a cord 18 toroidally extending between a pair of the bead portions B in a meridional direction and arranged over a full circumference of the green tire N at an equal interval P in a circumferential direction thereof. The cord 18 is formed by covering an outer surface of a monofilament (single wire) or a cable comprised of twisted filaments with a coating rubber, but the use of the coating rubber may be omitted, if necessary. In the illustrated embodiment, only the cord 18 is shown without showing the coating rubber.

Numeral 20 is comprised of many circumferential portions (corresponding to the number of the arch portions 19) of the cord 18 arranged in the bead portions B and extending substantially in the circumferential direction in substantially a semi-oval form. These circumferential portions 20 are alternately arranged in the bead portions B and connect radially inward ends of the adjacent arch portions 19 to each other in each of the bead portions B.

The cord array 17 is shaped by repeating over a full circumference of the green tire N a working operation that the cord 18 is extended from one of the bead portions B to the other bead portion B along the outer surface of the support in a meridional direction to form a toroidal arch portion 19 and extended substantially in the circumferential direction at the other bead portion B by a given distance to form a circumferential portion 20 connected to the inner end of the arch portion 19. It is extended from the other bead portion B to the one bead portion B in the meridional direction to form another toroidal arch portion 19 connected to the circumferential portion 20 and separated by the distance P from the arch portion 19 on a tread center in the circumferential direction. It is again extended substantially in the circumferential direction in the one bead portion B by a given distance to form another circumferential portion 20 connected to the inner end of the second arch portion 19 until the arch portions 19 are arranged over a full circumference of the green tire N. When the cord 18 is put onto the inner rubber layer 12, a boundary between the arch portion 19 and the circumferential portion 20 is located in the vicinity of the inner wire bead reinforcing layer 13. Thus, the inner bead wire reinforcing layer 13 is arranged inside the cord array 17 in the axial direction and in the vicinity of the boundary between the arch portion 19 and the circumferential portion 20.

The carcass 16 is constructed by repeating the aforementioned shaping work of the cord array 17 n times in total (2 times in the illustrated embodiment) while offsetting by a distance L obtained by dividing the distance P by n in the circumferential direction every the shaping of the cord array. As a result, the n layers (two layers) of the cord arrays 17 are arranged at a state of offsetting by the distance L in the circumferential direction. When the n layers (two layers) of the cord arrays 17 each comprised of the arch portions 19 separated by the equal distance P in the circumferential direction and the circumferential portions 20 alternately connecting inner ends of the adjacent arch portions 19 in both bead portions B are arranged at a state of offsetting by the distance L to form the carcass 16, the distance P between the arch portions 19 in the cord array 17 is wider by n times (two times) than a constant pitch C (equal to the offset distance L) of the conventional technique and hence the putting work of the cord 18 is simple and easy for the formation of the carcass 16. In this case, the carcass 16 may be simply and rapidly shaped only by the one rotation (360 degree) of the support when the putting work of the cord 18 is carried out by disposing two cord putting machines (not shown) on the circumference of the support at 120° separated away from each other in the circumferential direction and simultaneously operating these machines.

When the n layers (two layers) of the cord arrays 17 are arranged at a state of offsetting by the distance L as mentioned above, a portion of the circumferential portion 20 in the cord array 17 is overlapped with a part of the circumferential portion 20 in the other cord array 17 to form an overlap region K. In the illustrated embodiment, the overlap region K is formed between a central part of the circumferential portion 20a in the first cord array 17a and a central part of the circumferential portion 20b in the second cord array 17b. In the overlap region K, two cords 18 substantially contact with each other while overlapping them in the axial direction (at a state of arranging on a straight line substantially parallel to an inner circumference of the bead portion B). When the overlap regions K each formed by substantially contacting the circumferential portions 20 of the cord arrays with each other are arranged in the carcass 16, these circumferential portions 20 are restrained with each other by the contact in the overlap regions K to make the size of the circumferential portion as a whole apparently larger than that of the circumferential portion in the cord 18 itself.

Numeral 23 is an outer bead wire reinforcing layer disposed in the bead portion B of the green tire N. The outer bead wire reinforcing layer 23 is arranged at the outside of the cord array 17 in the axial direction in the vicinity of the boundary between the arch portion 19 and the circumferential portion 20. The inner and outer bead wire reinforcing layers 13 and 23 form a bead wire reinforcing layer 22 sandwiching the cord arrays 17 from both sides thereof in the vicinity of the boundary between the arch portion 19 and the circumferential portion 20 as a whole. The bead wire reinforcing layer 22 is arranged in the vicinity of the boundary between the arch portion 19 and the circumferential portion 20 located outward from the overlap region K of the circumferential portions 20 having a large size in the radial direction as previously mentioned, so that it strongly anchors the overlap region K in the bead portion B to surely prevent the getting out of the circumferential portion 20 outward in the radial direction. In the illustrated embodiment, the arranging positions of the inner and outer bead wire reinforcing layers 22, 23 are such a position that the inward ends of these layers in the radial direction are located outward from a center of the overlap region K (a middle point between the cords 18 when the overlap region 18 is formed by overlapping the two cords 18 with each other) in the radial direction. The outer bead wire reinforcing layer 23 is constructed by spirally winding a bead wire 24 of a rubberized steel wire plural times at the outside of the support or the outside of the cord arrays 17 in the circumferential direction. Moreover, the outer bead wire reinforcing layer 23 is used by winding the bead wire 24 at 1–3 rows in the axial direction and at 5–10 columns in the radial direction. In this case, it is preferable that the row number in the outer bead wire reinforcing layer 23 is larger by 1–2 than that in the inner bead wire reinforcing layer 13.

Numeral 25 is a belt layer disposed on the outside of the carcass 16 in the radial direction and formed by spirally winding a rubber strip containing several parallel cords 26 therein on the outside of the carcass 16 plural times. Moreover, the plural belt layers 25 may be formed by putting the rubber strips one after another on the carcass at a state of inclining with respect to the tread center. In the latter case, the inclination direction with respect to the tread center is opposite in at least two layers. Numeral 27 is the top tread rubber disposed at the outside of the belt layer 25 in the radial direction, and numeral 28 is a side tread rubber disposed at each of the sides of the carcass 16 in the axial direction. The top tread rubber and side tread rubber 27, 28 are formed by spirally and helically winding a band-shaped rubber on the outsides of the belt layer 25 and the carcass 16 plural times. In this way, the green tire N is shaped and the support provided with the green tire N is transported to and housed in a vulcanization mold (outer mold) and then vulcanized to form a pneumatic tire.

Figure 7:
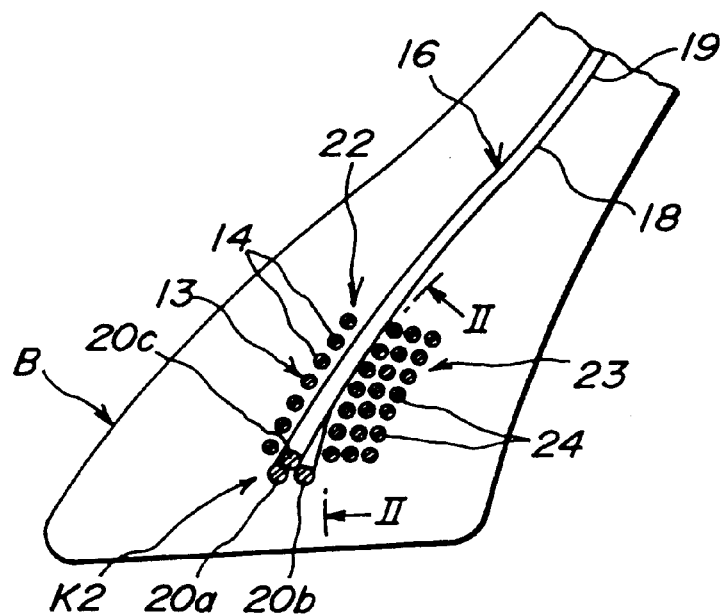
FIG. 7 is a meridionally section view of a bead portion in the second embodiment.
Figure 8:
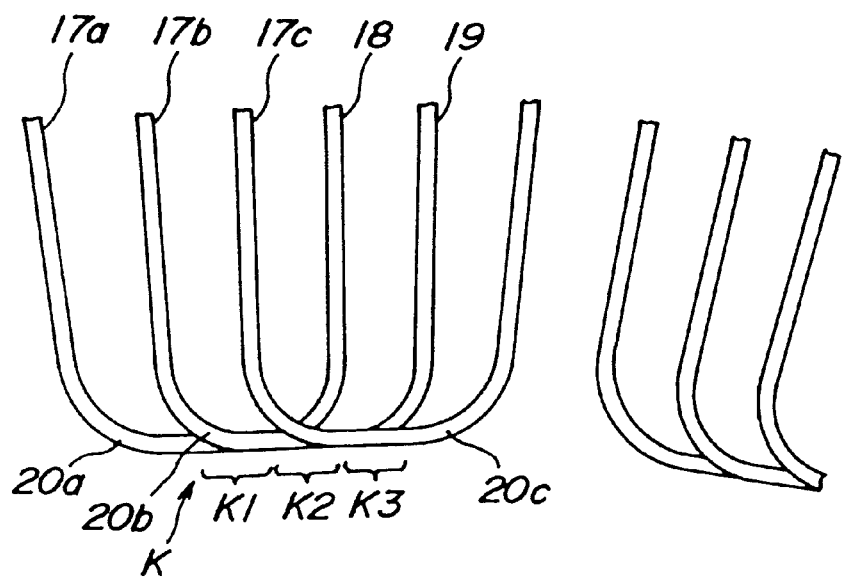
FIG. 8 is a view showing an arrangement of the cord array by arrows II—II in FIG. 7.

In FIGS. 5–8 is shown a second embodiment of the invention. In this embodiment, the carcass 16 comprised of three layers of cord arrays 17 is shaped by repeating the shaping step of the cord array 17 three times in total while offsetting the shaping of the cord array 17 by the distance L in the circumferential direction. As a result, a first overlap region K1 is formed by overlapping central parts of circumferential portions 20a, 20b of first and second cord arrays 17a, 17b with each other, and a second overlap region K2 is formed by overlapping central parts of circumferential portions 20a, 20b, 20c of first, second and third cord arrays 17a, 17b, 17c with each other, and a third overlap region K3 is formed by overlapping central parts of circumferential portions 20b, 20c of second and third cord arrays 17b, 17c with each other. In the first and third overlap regions K1 and K3, two cords 18 substantially contact with each other while overlapping in the axial direction likewise the case of FIG. 3, while three cords 18 substantially contact with each other while overlapping in the axial direction in the second overlap region K2 as shown in FIG. 7. In the second overlap region K2, the circumferential portions 20a, 20b, 20c are located in respective vertexes of an equilateral triangle depicted on meridional section having in this particular embodiment a base substantially parallel to an inner circumference of the bead portion B (a side located inward in the radial direction). Hence one of these circumferential portions substantially contacts with the other remaining circumferential portions (e.g. the circumferential portion 20a contacts with the circumferential portions 20b, 20c). Thus, the restraining force among the circumferential portions 20a, 20b 20c in the second overlap region K2 becomes large to strongly prevent the getting out of these circumferential portions from the bead portion B. In the illustrated embodiment, the inner and outer bead wire reinforcing layers 13, 23 are concretely arranged so that the inner ends of these layers in the radial direction are located outward from a center of the second overlap region K2 (a midpoint of the equilateral triangle) in the radial direction. Moreover, the other construction and function are the same as in the first embodiment.

Figure 9:
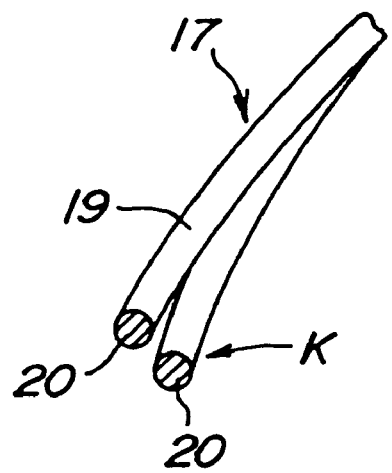
FIG. 9 is a meridional section view illustrating circumferential portions at an overlap region in a third embodiment of the invention.
Figure 10:
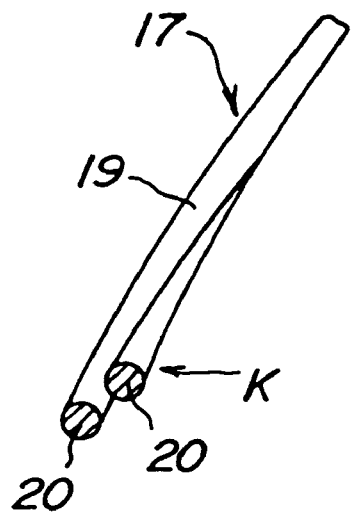
FIG. 10 is a meridional section view illustrating circumferential portions at an overlap region in a fourth embodiment of the invention.

In FIGS. 9 and 10 are shown third and fourth embodiments of the invention, in which the carcass is comprised of two layers of the cord arrays 17 likewise the first embodiment. In the third embodiment of FIG. 9, two circumferential portions 20 in the overlap region K are successively arranged on an straight line inclined toward a bead heel so as to approach to an inner circumference of the bead portion B. In the fourth embodiment of FIG. 10, two circumferential portions 20 in the overlap region K are successively arranged on an straight line inclined toward a bead heel so as to separate away from an inner circumference of the bead portion B.

Figure 11:
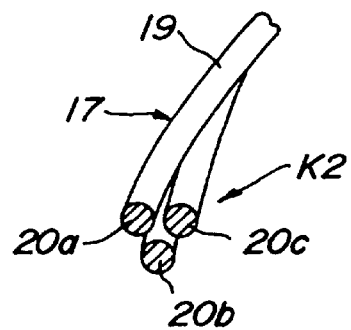
FIG. 11 is a meridional section view illustrating circumferential portions at an overlap region in a fifth embodiment of the invention.
Figure 12:
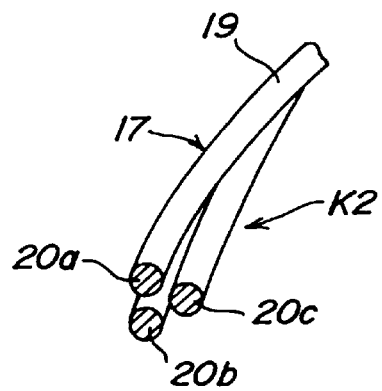
FIG. 12 is a meridional section view illustrating circumferential portions at an overlap region in a sixth embodiment of the invention.
Figure 13:
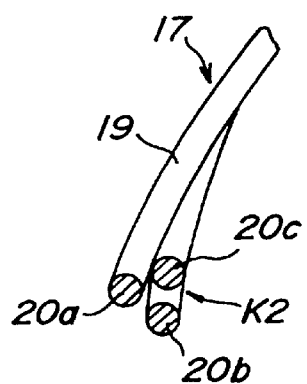
FIG. 13 is a meridional section view illustrating circumferential portions at an overlap region in a seventh embodiment of the invention.

In FIGS. 11, 12 and 13 are shown fifth, sixth and seventh embodiments of the invention, in which the carcass is comprised of three layers of the cord arrays 17 likewise the second embodiment. In the fifth embodiment of FIG. 11, the circumferential portions 20a, 20b, 20c in the second overlap region K2 are disposed in respective vertexes of an equilateral triangle having an upper side (a side located outward in the radial direction) substantially parallel to the inner circumference of the bead portion B. In the sixth embodiment of FIG. 12, the circumferential portions 20a, 20b, 20c in the second overlap region K2 are disposed in respective vertexes of an equilateral triangle having a left side (an axially inner side near to a bead toe) extending substantially in the radial direction. In the seventh embodiment of FIG. 13, the circumferential portions 20a, 20b, 20c in the second overlap region K2 are disposed in respective vertexes of an equilateral triangle having a right side (an axially outer side near to a bead heel) extending substantially in the radial direction. Moreover, the circumferential portions 20a, 20b, 20c may be disposed in any vertexes of the equilateral triangle if the shaping is possible.

In FIGS. 14, 15 and 16 are shown eighth, ninth and tenth embodiments of the invention, in which the carcass is comprised of three layers of the cord arrays 17 likewise the second embodiment. In the eighth embodiment of FIG. 14, the circumferential portions 20a, 20b, 20c in the second overlap region K2 are successively arranged on a straight line substantially parallel to the inner circumference of the bead portion B. In the ninth embodiment of FIG. 15, the circumferential portions 20a, 20b, 20c are successively arranged on an straight line inclined toward a bead heel so as to approach to an inner circumference of the bead portion B. In the tenth embodiment of FIG. 16, the circumferential portions 20a, 20b, 20c in the second overlap region K2 are successively arranged on an straight line inclined toward a bead heel so as to separate away from an inner circumference of the bead portion B.

Although the carcass 16 is comprised of two or three layers of the cord arrays 17 in the aforementioned embodiments, it may be constructed by arranging the cord arrays at four or more layers.

As mentioned above, according to the invention, the shaping of the carcass is simple and also the cord constituting the carcass can strongly be anchored in the bead portion.

What is claimed is:

1. A pneumatic tire comprising; a carcass made from at least one cord array comprised of many arch portions of a cord extending between a pair of bead portions in a meridional direction and arranged over a full circumference of the tire at an equal interval P in a circumferential direction of the tire and many circumferential portions of the cord alternately arranged in the bead portions, each connecting ends of adjacent arch portions to each other in the bead portion and extending substantially in the circumferential direction, wherein each cord array is arranged at n layers, n being 3, while offsetting these layers by a distance L obtained by dividing the interval P by n in the circumferential direction and the circumferential portions of these layers made from the cord array are substantially contacted with each other to form an overlap region, and an inner and outer bead wire reinforcing layer formed by winding a bead wire plural times in the circumferential direction is arranged so as to sandwich each cord array in the vicinity of a boundary between the arch portions and the circumferential portions from both sides thereof to thereby strongly anchor the overlap region of the carcass and, the circumferential portions in the overlap region are disposed in respective vertexes of an equilateral triangle so as to substantially contact one of the circumferential portions with the other remaining circumferential portions in the overlap region.

2. A pneumatic tire according to claim 1, wherein an upper side of said equilateral triangle, located outward in the radial direction is substantially parallel to an inner circumference of said bead portions.

3. A pneumatic tire according to claim 1, wherein an axially inner side of said equilateral triangle extends substantially in the radial direction.

4. A pneumatic tire according to claim 1, wherein an axially outer side of said equilateral triangle extends substantially in the radial direction.

5. A pneumatic tire according to claim 1, wherein said inner and outer head wire reinforcing layers each comprise 1–3 rows in the axial direction and 5–10 columns in the radial direction of bead wire windings.

6. A pneumatic tire of claim 5, wherein the number of rows in the axial direction of bead wire windings in said outer bead wire reinforcing layer is larger by 1–2 than that in said inner bead wire reinforcing layer.

* * * * *